April 20, 1937. F. MANNING ET AL 2,078,204
HUMIDIFYING APPARATUS
Filed Sept. 21, 1935
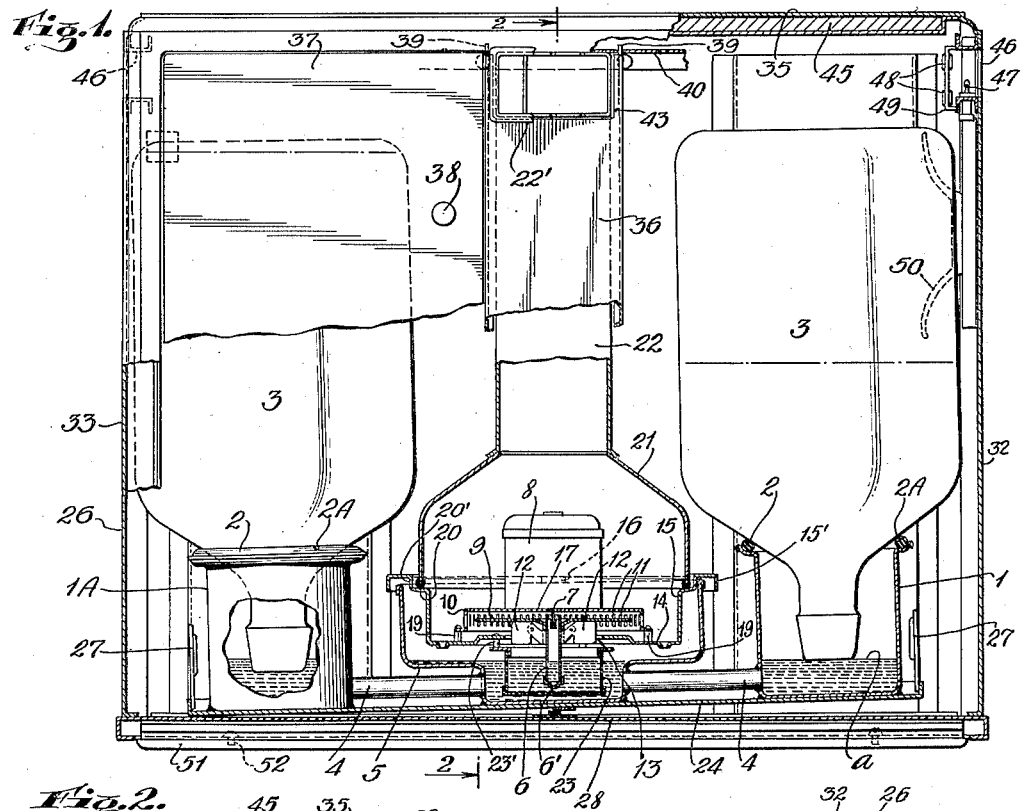
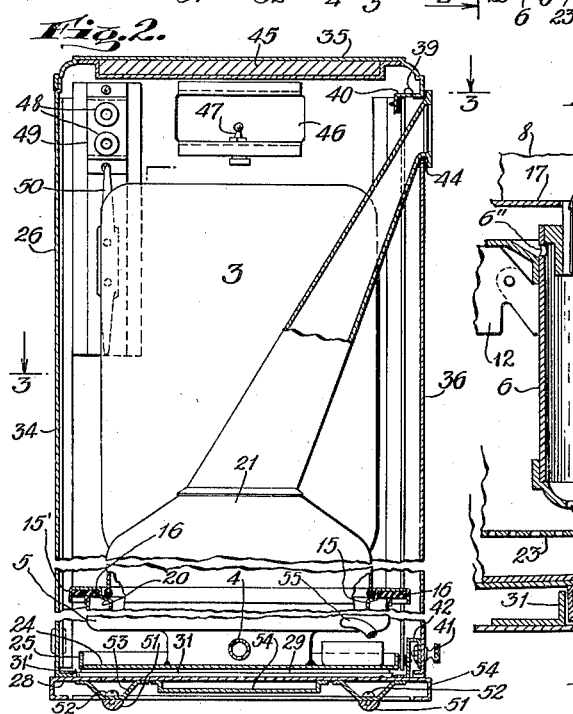
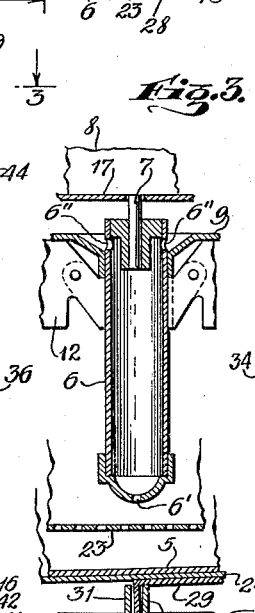
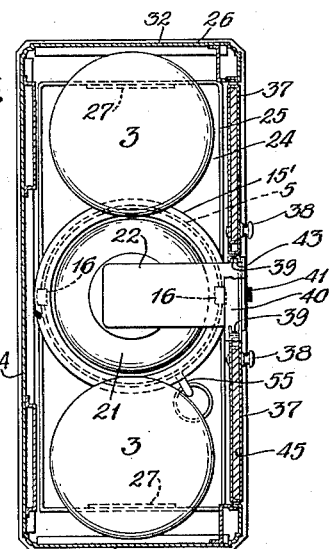

Patented Apr. 20, 1937

2,078,204

UNITED STATES PATENT OFFICE 2,078,204

HUMIDIFYING APPARATUS

Fowler Manning and Streckfus W. Manning, Bronxville, N. Y., assignors to American Radiator Company, New York, N. Y., a corporation of New Jersey Application September 21, 1935, Serial No. 41,520

19 Claims. (Cl. 261—91)

A general object of the present invention is to provide humidifying apparatus with novel and effective means giving the apparatus a suitably large humidification water storage or reservoir capacity and facilitating the ready replenishment from time to time of the supply of water held or stored in the apparatus.

Our improved humidifying apparatus is characterized by its inclusion of means providing a water receiving space and for supporting a plurality of water supply vessels each closed except for a bottom outlet received in said space so that the water will pass from the vessel through said outlet into said space only as the water level in the latter is so lowered that it does not seal said outlet, and for varying the water sealing levels for the different vessel outlets, so that the supply vessels in the apparatus may empty one at a time and not simultaneously. An important advantage of such apparatus is that when a water supply vessel is emptied, it need not be refilled or replaced by another filled vessel immediately, but may be so refilled or replaced at any convenient time during a following period of operation in which humidification water is being supplied by another vessel which starts to empty only after the first mentioned vessel becomes entirely empty. In the preferred practice of the invention, the water supply vessels used are glass bottles of convenient size which are inverted when inserted in the humidifying apparatus.

The present invention is especially suitable for incorporation in a portable humidifying unit adapted for use in office and residence rooms, and preferably sufficiently compact and enclosed in such a casing or housing as to permit the unit to form a part of the movable equipment or furniture of the room in which it is used. In a preferred form of such a portable unit, the water receiving space is formed by two bottle receiving receptacles and a chamber connected to said receptacles and from which water is withdrawn as needed for humidification purposes, the water level being normally the same in the two receptacles and chamber. The two receptacles and chamber of said unit are mounted on a tilting support and so disposed relative to the axis of movement of the support, that the latter will tilt in response to a difference in the relative amounts of water in the two bottles supported in said receptacles and thereby lower the sealing level for the bottle containing the larger amount of water below the sealing level for the bottle containing the smaller amount of water.

In such a unit containing one full bottle and one partially emptied bottle, water passes to the supply chamber from the partially emptied bottle as required to supply the need for humidification water and to maintain the water level in the receptacle receiving the neck of the full bottle above the sealing level for the latter, so long as the partially emptied bottle contains any water. After one bottle is entirely emptied, a further withdrawal of water from the said chamber will lower the water level in both receptacles and chamber until that level falls below the sealing level for the full bottle, whereupon the latter will begin to empty. When the emptied bottle is removed, refilled, and put back in place, or is replaced by a full bottle, following a partial emptying of the bottle then supplying humidification water, the support will tilt and elevate the last mentioned bottle which will continue to supply the demand for humidification water until completely emptied.

In addition to its above mentioned features, our invention is characterized by special features of construction and arrangement contributing to the mechanical excellence of the apparatus, and facilitating bottle replacements, and the removal of the humidifying apparatus from its casing when necessary for inspection, cleaning, adjustment, or repairs.

The various features of novelty which characterize our invention are pointed out with particularity in the claims annexed to and forming a part of this specification. For a better understanding of the invention, however, and the advantages possessed by it, reference should be had to the accompanying drawing and descriptive matter in which we have illustrated and described a preferred embodiment of the invention.

Of the drawing:

Fig. 1 is a front elevation of a humidifier unit of preferred form with parts broken away and shown in vertical section;

Fig. 2 is a section on the broken line 2—2 of Fig. 1;

Fig. 3 is a section on the broken line 3—3 of Fig. 2; and

Fig. 4 is a section, on larger scale than Fig. 1, of parts shown in section therein.

The preferred form of humidifying unit shown in the drawing, comprises two water receptacle or reservoir members I and IA, arranged side by side and each in the form of a cup-shaped member of sheet metal. Each of the members I and IA is provided at its open upper end with a seat for an inverted water bottle 3. Each seat may well be formed by a rubber ring 2 cemented to a rim enlargement of the upper end of the corresponding receptacle member. The neck of the bottle 3 associated with each receptacle member, extends down into the latter, the shoulder portion of the bottle resting on the seat 2, and the mouth of the bottle being open. Each seat 2 is notched, as indicated at 2A, to provide an air passage for maintaining atmospheric pressure in the air space above the water in the receptacle. Each of the receptacles 1 and 1A is connected at a level below the normal water level therein, to a cup shaped receptacle or reservoir 5, by a corresponding pipe 4. The receptacle 5 forms the water supply chamber for a humidifying pump.

The latter is in the form of a vertically disposed tubular element 6 suspended from the shaft 7 of its electric driving motor 8. The lower end of the tubular element 6 extends down into the water in the pump supply chamber 5, and is closed except for a small central inlet 6'. Adjacent its upper end and well above the normal water level in the chamber 5, the pump element 6 is provided with outlets 6''. In operation the rapid rotation of the tubular element 6 causes a flow of water into and through the element, and out of the latter through its ports 6''. The water issuing through the outlets 6'' passes onto a horizontal sheet metal disc 9 coaxial with, and secured to the pump element 6. Centrifugal force action causes the water discharged onto the disc 9 through the ports 6'', to move outward in a film to the edge of the disc from which the water is discharged with a substantial velocity.

The water so discharged from the disc 9 impinges against a stationary cylindrical part 10 surrounding, and spaced away from the periphery of the disc 9. The cylindrical part 10 is formed with a multiplicity of discharge orifices 11 shown as in the form of vertical slots extending from a level appreciably above the top side of the disc 9 to a level appreciably below the lower side of the disc. The water comes to the inner ends of the orifice slots 11 in finely divided form, and is in effect atomized and moved through and discharged from the orifice slots in the form of a mist, by air set in motion by fan blades or vanes 12 secured to the under side of the disc 9 and extending outwardly from the element 6 for more or less of the radial depth of the disc 9. The disc 9 and vanes 12 thus form the impeller of an air moving fan which has its air inlet 13 formed by the central aperture in the bottom portion of a dished sheet metal part 14. The latter, as shown, has a rim portion 15 with a depending peripheral flange 15'. The rim portion 15 extends over and telescopically receives and is supported by the upper edge of the member 5 through two rubber bodies 16 interposed between the rim portions 15 of the member 14 and the upper edge of the member 5 at diametrically opposed points along their peripheries. The two bodies space the parts 5 and 14 apart so that air may pass through the open joint between the members into the space within the member 5 above the water level therein and below the member 14. The rubber bodies 16 also provide hinge joints between the members 5 and 14, permitting their relative rotative movement about a horizontal axis as and for a purpose hereinafter stated.

The bodies 16 also provide a resilient noise and vibration eliminating support for the motor 8, which is supported by the member 14 through parts including the cylindrical part 10. The latter as shown is an integral downturned flange portion of a sheet metal disc 17 through which the motor shaft passes and on which the frame of the motor 8 is secured. At its lower edge, the cylindrical part 10 terminates in an outturned flange portion 18 secured to the member 14 by posts 19. At the inner side of its rim portion 15, the member 14 is shaped to provide an annular seat 20 for the base of a bell shaped member or hood 21, said seat being surrounded by an uprising rim portion 20' of the member 14. The hood 21, member 14, and receptacle 5 form a casing enclosing the motor 8, and all portions of the air and water impelling means operated by the motor. The highly humidified air and entrained water mist passing upward through the motor enclosing casing is discharged with considerable velocity imparted thereto by the impeller element, through an outlet nozzle 22 provided at the upper central portion of the top of the hood 21, the moisture laden air or mist being emitted in a defined stream from the nozzle.

Advantageously, and as shown, a cup shaped screen 23, suspended by parts 23' from the member 14, extends across the path of flow of water entering the receptacle 5 through the pipes 4 and passing to the pump inlet 6. Advantageously and as shown, the water holding capacity of the member 5 is reduced by reducing the diameter of the lower portion of the member, to thereby insure a bodily flow of water through the member 5 rapid enough to prevent the accumulation of stale or foul water in the chamber 5 during the normal operation of the apparatus.

As shown the receptacle and chamber members 1, 1A, and 5 are welded or otherwise rigidly mounted on a chassis or base support 24 in the form of a metal plate of rectangular outline and advantageously provided with an upturned marginal rim or flange portion 25 which adds stiffness to the chassis. The chassis 24 with the parts supported thereon, is shown as removably received in a casing or housing 26 of rectangular outline and advantageously formed wholly or mainly of sheet metal. To facilitate the manipulation of the chassis, and particularly its movements into and out of the casing, handle parts 27 are secured to the ends of the chassis.

For the purposes of the present invention the chassis 24 is pivotally mounted on the base or floor member 28, so as to turn through a small angle about a horizontal axis to thereby hold whichever of the two bottles 3 is more nearly filled with water in a position lower than that of the bottle containing less water. For the general purposes of the present invention, the form of the pivotal or hinge connection between the chassis and its support is immaterial. In the desirable construction illustrated, the hinge connection includes an angle bar 29 having one flange welded to the under side of the chassis plate 24, and having its other flange extending downwardly into a channel open at its upper edge and formed, as shown, by and between the spaced apart uprising flanges of two angle bars 30 and 31 having their horizontal flanges facing in opposite directions and welded to the floor or base member 28 of the casing 26. The channel receiving the vertical flange of the angle bar 29 may be closed at its rear end by a transverse end portion 31' of the angle bar 31, which forms a stop holding the chassis at a suitable distance from the rear wall of the casing 26.

With the angle bars proportioned as illustrated in Fig. 4, the upper edge of the uprising flange of the angle bar 30 forms a fulcrum on which the chassis 24 may rock through the small angle required to turn it from one position in which one end of the chassis engages and is supported by the casing floor 28, and a second position in which the other end of the chassis engages said floor. As shown the angle bars 29, 30 and 31 extend transversely to the length of the chassis 24, and the vertical flange of the angle bar 30 is approximately midway between the axes of the receptacles 1 and 1A, and approximately beneath the center of gravity of the chassis 24 and parts supported by the latter, when the chassis is in a horizontal intermediate position and the two bottles 3 hold the same amounts of water. With one bottle holding more water than the other, the chassis will tilt to lower the bottle containing the greater amount of water. Even with equal amounts of water in the two bottles, the chassis 24, if tilted to bring either end into engagement with the horizontal floor 27, will then be in stable equilibrium and have no tendency to tilt out of the position occupied.

As shown in Fig. 1, the righthand bottle 3 is about half filled and the lefthand bottle 3 is almost entirely filled with water. The common water level $a$ in the receptacles 1, 5, and 1A, is then approximately at the sealing level for the righthand bottle 3, so that any reduction in the height of the water level $a$ will result in the passage of water out of the righthand bottle 3, thereby restoring the height of water level $a$. As shown in Fig. 1, the mouth of the full lefthand bottle is some distance below the water level $a$, so that the discharge of water from that bottle is effectually prevented when the apparatus is in the condition shown in Fig. 1. The emptying of the righthand bottle will not result in the discharge of water from the lefthand bottle until the humidifying pump has withdrawn sufficient water from the supply chamber 5 to lower the common water level in the chambers 1, 1A and 5 far enough to break the previously existing water seal for the mouth of the lefthand bottle 3. When one bottle is full and the other bottle partly full, the normal water level will be the level $a$ of Fig. 1, regardless which of the bottles is the full one, assuming that two bottles are similar in shape so that their mouths will lie in the same horizontal plane when the chassis 24 is horizontal.

The casing 26, as shown, comprises vertical end walls 32 and 33 and a vertical rear wall 34, each rigidly connected to the floor member 28, and to the top casing wall 35. To permit bottle replacements and the removal and replacement of the chassis 24, the casing 26 is provided at its front side with a removable central panel 36 and with a door 37 at each side of the central panel. Each door may have its edge remote from the central panel hinge connected to the casing body in any suitable manner. As shown, each door 37 is provided with an operating knob 38, and is wide enough to permit the ready removal from, and insertion in, the adjacent receptacle 1 or 1A, of a bottle 3, when the door is open. The width of the two doors and central panel exceeds the length of the chassis 24, so that the latter may be readily removed and replaced when the doors are opened and the central panel is removed. The latter is normally secured in place, as shown, by means of projections 39 at its upper end, which enter socket openings formed in a bracket part 40 secured to the depending front edge portion of the top wall 35 of the casing, and by means of a thumb screw 41 detachably securing the lower end portion of the panel 36 to a bracket 42 attached to the floor member 28.

The panel member 36 is formed with a recess or notch 43 in its upper end shaped to receive the adjacent portion of the nozzle part 22. As shown, the notch 43 and the portion of the nozzle part received therein, are rectangular in cross section, and the nozzle is formed at its end with a marginal rim or bead 22' which at the bottom and sides of the nozzle end, abuts against the outer side of the panel 36 at the margin of the notch 43, and at the top of the nozzle end, abuts against the adjacent down turned portion of the casing top member 35. The downwardly inclined body portion of the nozzle member immediately adjacent the bottom of the notch, engages the inner side of the panel member 36 so that the upper end of the nozzle member is snugly anchored in place when the panel 36 is secured to the casing.

The joint between the nozzle and the edges of notch 43 and adjacent edge of the top wall member 35, may receive a gasket like part 44 of yielding material preventing vibration and noise. The nozzle 22 may or may not be provided with a grill at its discharge end. The two previously mentioned rubber bodies 16 are located directly above the hinge connection between the chassis 24 and the casing bottom wall 28, and serve in effect as hinge pintles for turning movement of the member 5 relative to the member 14 and hood 21, when the chassis is oscillated between its two normal positions. Since the hinge bodies 16 are located somewhat above the hinge connection between the chassis and the casing bottom wall, the tilting movement of the chassis tends to produce some horizontal movement of said hinge connection in the direction of the length of the chassis, between the parts 5 and 14, but the required tilting movement of the chassis is so slight that with the lost motion between parts permitted by the described construction, the said horizontal movement has no tendency to any objectionable derangement of the parts, or interference with the required chassis movement.

The doors 37 and various walls of the casing may be given additional strength and rigidity, as shown, by forming the doors and portions of said walls of two thicknesses of sheet metal with celotex or other lightweight stiffening material 45, between the double walls. Hand hole openings 46 are formed in the end walls 32 and 33 of the casing to facilitate handling of the latter. A control switch 47 may advantageously be mounted as shown, in one of said hand hold openings. The energizing conductors for the motor 8 may be brought into the casing through an opening or openings formed in one end wall, and as shown, pass through adjacent grommets 48 carried by a bracket 49 detachably connected to the casing wall at its inner side. An adjacent bracket 50 secured to the inner side of the casing wall, serves as a support about which excess portions of the energizing conductors within the casing may be looped.

The bottom wall of the casing is given increased stiffness, and its movements over a floor are facilitated, by attaching a pair of skids or runners to the underside of the casing bottom wall. As shown each skid comprises a bar 51 of half round metal, connected by screws 52 to a trough shaped piece of metal 53 having at the tops of its sides horizontal flanges which are welded against the underside of the bottom wall 28.

The screws 52 may be tightened and loosened by a screwdriver inserted through openings formed in the floor member 28, one above each screw. Further stiffness is given to the bottom wall portion of the casing, by forming the latter with a flange 54 including a vertical portion and reversely bent horizontal portion.

In putting a full water bottle in place in either receptacle, some water is ordinarily discharged from the bottle into the corresponding receptacle 1, or 1A. To prevent an objectionable rise in water level in the pump supply chamber 5 from this cause, the latter is provided with an overflow spout 55 which may discharge into a cup or like receptacle placed on the chassis.

While in accordance with the provisions of the statutes, we have illustrated and described the best form of embodiment of my invention now known to us, it will be apparent to those skilled in the art that changes may be made in the form of the apparatus disclosed without departing from the spirit of our invention as set forth in the appended claims and that in some cases certain features of our invention may be used to advantage without a corresponding use of other features.

Having now described our invention, what we claim as new and desired to secure by Letters Patent, is:

1. In humidifying apparatus, the combination with means providing a water receiving space, of two water supply vessels each closed except for a bottom outlet received in said space, and means for adjusting the relative elevations of said vessels through a range permitting the outlet of either vessel to be raised to a level above that of the outlet of the other vessel, whereby water may be discharged from the vessel having its outlet at the higher level as required to maintain a water level in said space sealing the outlet from the other vessel, and humidifying means having an inlet disposed to receive water from said space.

2. In humidifying apparatus, the combination with a movable member providing a water receiving space, of two water supply vessels supported by said member and each closed except for a bottom outlet received in space space, said member being movable between two positions in one of which the outlet of one of said vessels is above, and in the other of which it is below the outlet of the other vessel, and humidifying means having an inlet disposed to receive water from said space.

3. In humidifying apparatus, the combination with two water supply vessels each closed except for a bottom outlet, of a member having a water receiving space, means for supporting said vessels in side by side relation with their outlets received in said space, means supporting said member for gravitational movement to thereby hold the outlet of whichever of said vessels may contain less water than the other vessel at a higher level than the outlet of the last mentioned vessel, and humidifying means having an inlet disposed to receive water from said space.

4. In humidifying apparatus the combination with two water supply vessels each closed except for a bottom outlet, of a member pivoted to turn about a horizontal axis and having means for supporting said water supply vessels, one at each side of said axis, means providing a water receiving space in which the outlets of the vessels supported by said member are located, said member being adapted to turn about said axis when said vessels contain unequal amounts of water into position to hold the outlet of the bottle containing the lesser amount of water at a higher level than the outlet of the other vessel, and humidifying means having an inlet disposed to receive water from said space.

5. In humidifying apparatus the combination with two water supply vessels each closed except for a bottom outlet, of a member pivoted to turn about a horizontal axis and having means for supporting said water supply vessels one at each side of said axis, means providing a water receiving space in which the outlets of the vessels supported by said member are located, said member being adapted to turn about said axis when said vessels contain unequal amounts of water into position to hold the outlet of the bottle containing the lesser amount of water at a higher level than the outlet of the other vessel, means limiting the tilting movement of said member to insure a small predetermined maximum difference in elevation of the outlets of the two vessels, in any position of said member, and humidifying means having an inlet disposed to receive water from said space.

6. In humidifying apparatus, the combination with means providing a water receiving space, of two water supply vessels each closed except for a bottom outlet received in said space, means for withdrawing water for humidification from said space and including a humidifying means having an inlet connected to said space, and means responsive to the relative weights of said vessels and operating automatically when said vessels are unequally filled with water to hold the outlet of the vessel less fully filled above the outlet of the vessel more fully filled.

7. Humidifying apparatus comprising in combination a pair of receptacles each open at its top and having means for supporting an inverted water supply bottle with the neck of the latter extending into the receptacle so that the mouth of the bottle may be sealed by liquid in the receptacle, a common support for said receptacles adapted to tilt about a horizontal axis intermediate said receptacles as required to hold the mouth of a bottle partially filled with water and supported by either receptacle at a higher level than the mouth of a similar bottle containing more water and supported by the other receptacle, and means for withdrawing water for humidification from and equalizing the water levels in said receptacles and including a humidifying means having an inlet disposed to receive water from both of said receptacles.

8. In humidifying apparatus, the combination with a housing having a bottom wall member, of a supporting member within the housing, a pivotal connection between said members permitting movement of said support member about a horizontal axis and comprising two vertical flange parts secured to one of said members and spaced to form a slot open at its edge adjacent the other member and a flange part secured to the last mentioned member and extending into said slot, means mounted on said support member comprising a water receiving space, and two water supply vessels supported by said support member, one at each side of said axis and each closed except for a bottom outlet received in said space and each moved by tilting movement of said support member about said axis between levels respectively above and below the level of the outlet of the other vessel, and humidifying means having an inlet disposed to receive water from said space.

9. In humidifying apparatus, the combination with a housing having a bottom wall member, of a supporting member within the housing, a pivotal connection between said members permitting movement of said support member about a horizontal axis and comprising separable parts secured to said members, means mounted on said support member comprising a water receiving space, and two water supply vessels supported by said support member, one at each side of said axis and each closed except for a bottom outlet received in said space and adapted to be moved by tilting movement of said support member about said axis between levels respectively above and below the level of the outlet of the other vessel, and humidifying means having an inlet disposed to receive water from said space, said housing comprising a wall portion separable from the remaining portion of the housing to permit the removal from the housing of said supporting member.

10. In humidifying apparatus, the combination with a housing, of a member mounted in the lower portion of said housing for movement relative thereto about a horizontal axis, means carried by said member providing a water receiving space and comprising means for removably supporting two water supply vessels, one at each side of said axis, and each closed except for a bottom outlet received in said space, humidifying means mounted on said member and comprising air and water impelling means supplied with water from said space, casing means for said impelling means including a casing supported on and movable relative to said member and including a discharge nozzle extending through, and anchored in an upper portion of said housing.

11. In humidifying apparatus, the combination with a housing, of a member mounted in the lower portion of said housing for movement relative thereto about a horizontal axis, means carried by said member providing a water receiving space and comprising means for removably supporting two water supply vessels, one at each side of said axis and each closed except for a bottom outlet received in said space, humidifying means mounted on said member and comprising air and water impelling means supplied with water from said space, said housing comprising a wall transverse to said axis and including a vertical portion in front of said axis, and a door at each side of said vertical portion which may be opened to permit replacement of a vessel supported by said member at the corresponding side of said axis, said humidifying means including a casing part formed with a discharge nozzle extending through said vertical housing portion.

12. In humidifying apparatus, the combination with a housing, of a member mounted in the lower portion of said housing for movement relative thereto about a horizontal axis, means carried by said member providing a water receiving space and comprising means for removably supporting two water supply vessels, one at each side of said axis and each closed except for a bottom outlet received in said space, humidifying means mounted on said member for movement relative thereto about an axis parallel to the first mentioned axis and comprising air and water impelling means supplied with water from said space, said housing comprising a wall transverse to said axis including a vertical portion in front of said axis, and a door at each side of said portion which may be opened to permit replacement of a vessel supported by said member at the corresponding side of said axis, said impelling means including a casing comprising a discharge nozzle extending through, and anchored in said vertical housing portion.

13. In humidifying apparatus, the combination with a housing, of a member removably mounted in the lower portion of said housing for movement relative thereto about a horizontal axis, means carried by said member providing a water receiving space, and comprising parts for removably supporting two water supply vessels, one at each side of said axis and each closed except for a bottom outlet received in said space, humidifying means comprising air and water impelling means receiving water from said space and a casing enclosing said impelling means and including an upper discharge nozzle portion, said housing comprising a wall transverse to said axis and including a removable portion in front of said axis, and a door at each side of said portion which may be opened to permit replacement of a vessel supported by said member at the corresponding side of said axis, said nozzle extending through said removable casing portion.

14. In humidifying apparatus, the combination with a housing, of a member mounted in the lower portion of said housing for movement relative thereto about a horizontal axis, means carried by said member providing a water receiving space, and comprising parts for removably supporting two water supply vessels, one at each side of said axis and each closed except for a bottom outlet received in said space, said means including a cup shaped receptacle above said axis and forming a part of said space, humidifying means comprising air and water impelling means and a casing enclosing said impelling means and comprising an intermediate portion overlying the rim of said receptacle, a lower portion within said receptacle and formed with a lower water inlet receiving water from said space, and an upper air inlet above the water level in said space, and an upper discharge nozzle portion extending through a portion of the wall of said housing above said axis, and means interposed between said intermediate casing part and said rim spacing the latter from said intermediate casing part and providing a rocking connection between said casing and member permitting their relative movement when said member turns about said axis.

15. In humidifying apparatus, the combination with a housing, of a member mounted in the lower portion of said housing for movement relative thereto about a horizontal axis, means carried by said member providing a water receiving space, and comprising parts for removably supporting two water supply vessels, one at each side of said axis and each closed except for a bottom outlet received in said space, said means including a cup shaped receptacle above said axis and forming a part of said space, humidifying means comprising air and water impelling means and a casing enclosing said impelling means and comprising an intermediate portion overlying the rim of said receptacle, and a lower portion within sad receptacle and formed with a lower water inlet receiving water from said space, and an upper air inlet above the normal water level in said space, and comprising an upper discharge nozzle portion extending through a portion of the wall of said housing above said axis, and bodies of resilient material interposed between said intermediate casing part and said rim, spacing the latter from said intermediate casing part and permitting relative movements of said casing and member when the latter turns about said axis.

16. In humidifying apparatus, the combination with a housing, of a member mounted in the lower portion of said housing for movement relative thereto about a horizontal axis, means carried by said member providing a water receiving space and comprising supports for removably supporting two water supply vessels one at each side of said axis and each closed except for a bottom outlet received in said space and comprising a portion above said axis, humidifying means comprising air and water impelling means and a casing enclosing said impelling means and resting on said portion, said casing including a lower water receiving portion extending down into and communicating with said space and an upper discharge nozzle portion extending through and anchored in an upper portion of the wall of said housing.

17. In humidifying apparatus the combination with a housing, a support pivotally mounted in said housing to turn about a horizontal axis, a pair of receptacles open at the top and mounted on said member, one at one side and the other at the opposite side of said axis, and each adapted to support an inverted water supply bottle with the neck of the bottle extending into said receptacle, humidifying means mounted on said support above said axis comprising air and water impelling means, a third receptacle mounted on said support communicating with each of the first mentioned receptacles and equalizing the water levels therein, and adapted to supply water to said impelling means.

18. In humidifying apparatus the combination with a housing including a bottom wall, a plate like support adjacent said bottom wall and pivotally mounted in said housing to turn about a horizontal axis through a small angle between one position in which said support engages said bottom wall at one side of said axis, and a second position in which it engages said bottom wall at the other side of said axis, a pair of receptacles open at their tops and mounted on said member, one at one side and the other at the opposite side of said axis, and each adapted to support an inverted water supply bottle, the neck of which extends into said receptacle, humidifying means mounted on said support above said axis and comprising air and water impelling means, and means mounted on said support and communicating with said receptacle and equalizing the water levels therein and adapted to pass water from either receptacle to said impelling means.

19. In humidifying apparatus, the combination with a supporting member providing a water receiving space, of two water supply vessels supported by said member and each closed except for a bottom outlet received in said space, supporting means for said member to which the latter is pivotally connected to turn about a horizontal axis substantially beneath the center of gravity of said member when the latter is in the position in which both vessel outlets are of the same level and both vessels are similarly filled with water, and humidifying means having an inlet disposed to receive water from said space.

FOWLER MANNING.
STRECKFUS W. MANNING.